J. GOFFIN & V. DE LONGUEVILLE.
MOLD FOR SHAPING GLASS PLATES.
APPLICATION FILED FEB. 18, 1911.
1,111,958.
Patented Sept. 29, 1914.
2 SHEETS—SHEET 2.
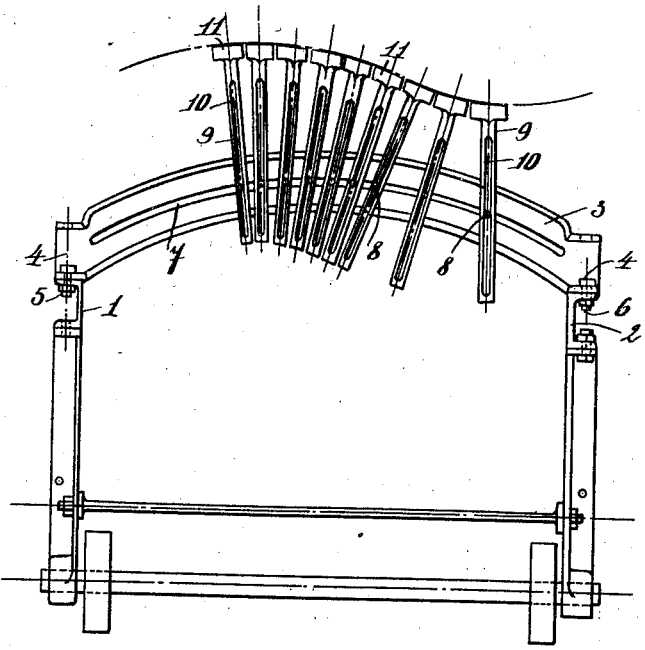
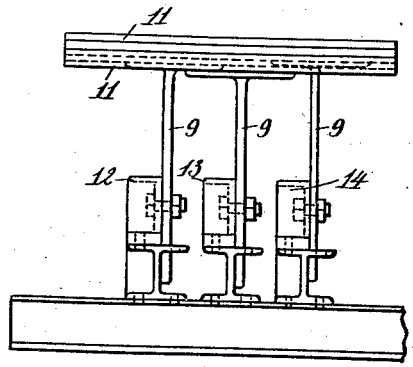
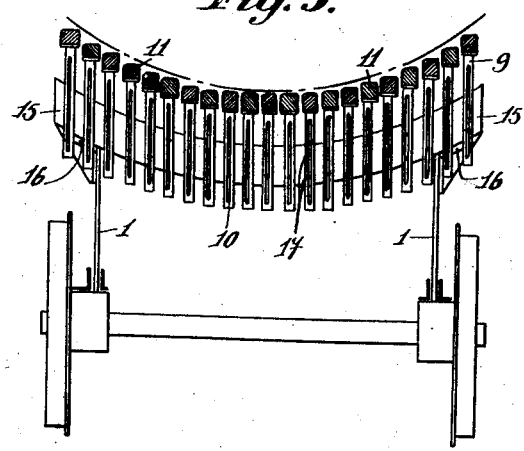

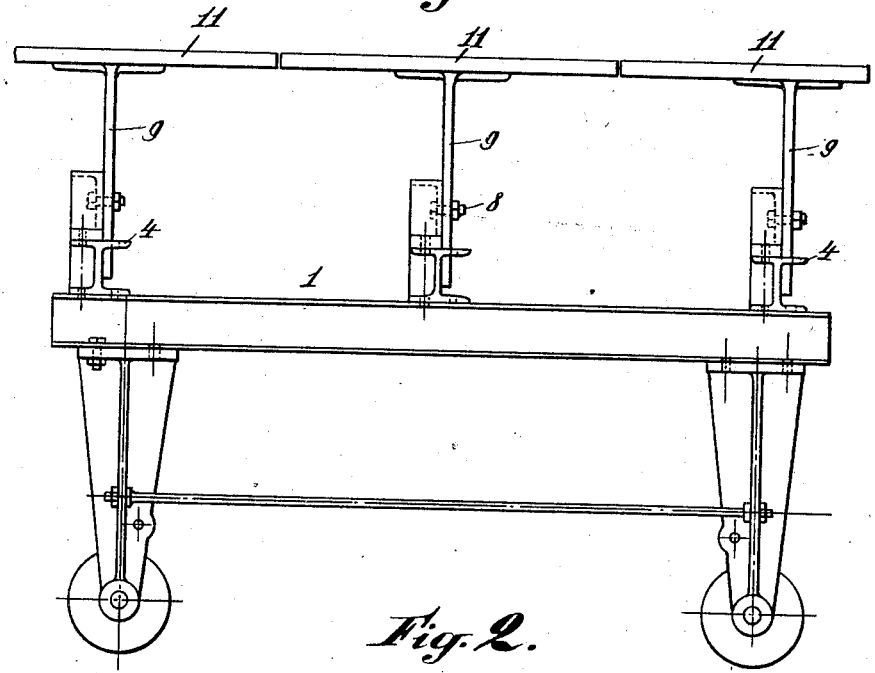
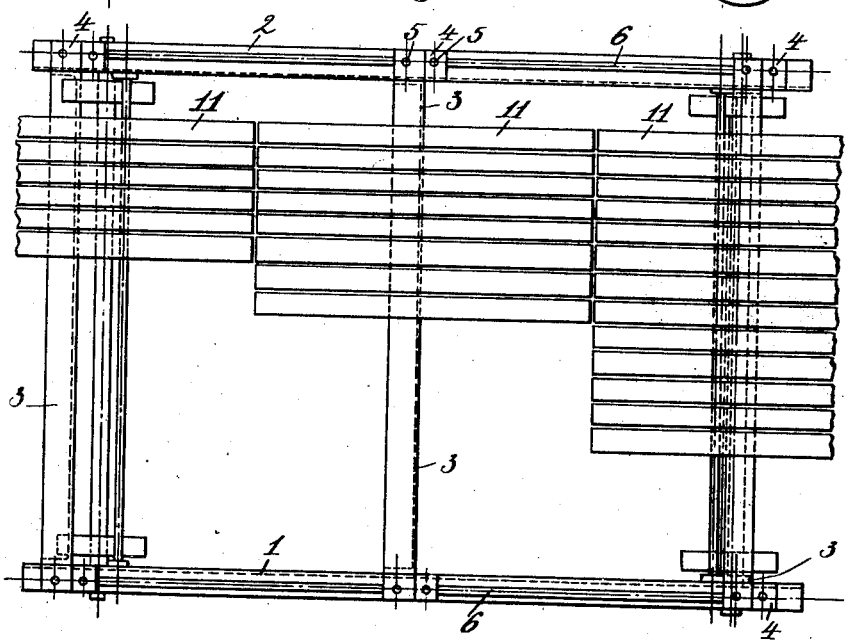

UNITED STATES PATENT OFFICE.

JULES GOFFIN AND VALMY DE LONGUEVILLE, OF MOLENBEEK, ST. JEAN, BELGIUM.

MOLD FOR SHAPING GLASS PLATES.

1,111,958.

Specification of Letters Patent.

Patented Sept. 29, 1914.

Application filed February 18, 1911. Serial No. 609,364.

*To all whom it may concern:*

Be it known that we, JULES GOFFIN and VALMY DE LONGUEVILLE, subjects of the King of Belgium, and residents of Molenbeek, St. Jean, Belgium, have invented certain new and useful Improvements in Molds for Shaping Glass Plates, of which the following is a specification.

This invention relates to an apparatus for shaping glass plates consisting essentially of a mold, the surface of which may be given any desired profile. The surface is formed of elements which by a very simple operation can be put into any desired position for forming the profile and may be held in that position.

In the accompanying drawings Figure 1 is a longitudinal section, Fig. 2 a plan and Fig. 3 a transverse section of one form of apparatus constructed according to the invention. Fig. 4 is a detail view showing a slight modification or particular case of the form shown in Figs. 1 to 3. Fig. 5 is a transverse section through a modification of the apparatus.

Generally the form which will be described with reference to Figs. 1 to 3 is to be preferred. As shown in these figures the apparatus consists of a wagon or truck formed of two longitudinal beams 1 and 2 of trough-section, or of any other suitable section, and of any suitable material, such as cast iron. The cross beams 3 of trough-section or any other suitable section and made of cast iron or other suitable material are curved and have feet 4 at their ends by which they are supported at suitable distances apart on the said longitudinal beams; with these beams they are connected by bolts 5 sliding in longitudinal slots 6 in the upper flange of the beam. This mode of connection renders it possible to displace the cross beams longitudinally on the beams 1 and 2 as may be desired. The feet 4 have two surfaces suitable for resting on beams 1 and 2 so that the cross beam may present an upwardly curved form as shown in Fig. 3 or may be reversed in accordance with the particular shape of profile to be obtained. This arrangement allows the same cross beam to be used for two modes of shaping. The cross beams may be straight. They are only curved for the purpose of diminishing the height and the stroke of the supporting rods. They may also have a more or less angular shape, such as ⌒, when certain profiles are required. The feet 4 may obviously be eliminated, in which case the bolts 5 are simply fixed to the ends of the beam either through the upper flange or the lower flange thereof.

The cross beams 3 have each a slot 7 wherein slide bolts 8 which serve to fix the supporting rods 9 of iron, cast iron or any other material. These supporting rods also have each a slot 10 so that they can slide on the bolts 8. This mode of assembling the rods and the use of a single bolt for fixing each permits of adjusting the position of the rods in any direction, that is to say the rods may be lowered, raised, inclined or transversely displaced. In this manner the profile of the shape to be obtained is very adequately and uniformly procured.

The heads 11 of the supporting rods 9 are of appropriate section and length. They may either be in one piece with their rods or may be separate and interchangeable. Different widths of head may be adopted, those having the smallest width serving as elements for a surface of small radius of curvature while the widest heads form the parts of surfaces which are plane or substantially plane.

In certain cases, for instance for spherical shape, the length of the heads is reduced and may even become equal to their width. In this case the cross beams are closer together and their form is modified in consequence. To form surfaces of very small radius of curvature, in which case the supporting rods might in consequence of their inclination cross each other, there is used a special arrangement of the kind shown in Fig. 4 which is a part view in longitudinal elevation. According to this modification there are used on the one hand two types of supporting rods, one having the rod fixed for example at two-thirds of the length of the head and the other having the rod fixed at the middle of the head as in the preceding case; and on the other hand several cross beams for one and the same series of supporting rods, these beams being placed at such a distance from each other that the ends of the heads abut against each other in the same plane.

In the case of Fig. 4, the supporting rods are placed successively on three cross beams 12, 13 and 14, the beams 12 and 14 carrying surface elements on which the rod is fixed at two-thirds the length of the head, while the beam 13 carries surface elements, the rods of which are fixed to the middle of their heads. In other words there are successively in the same series of supporting rods a rod fixed on the cross beam 12, the next on the cross beam 13, the next on the cross beam 14, the next on the cross beam 12 and so on. Other combinations of the same kind may be devised, this combination being given only by way of example.

It follows clearly from the preceding statements that this universal mold for shaping glass plates, such as window panes, has its surface elements adapted to be moved in any direction, namely:—1. Vertically, owing to the fact that the supporting rods can slide on the bolts which fix them; 2. Obliquely, owing to the fact that the rods can be inclined on the bolts that fix them; 3. Transversely, owing to the fact that the bolts which fix the rods can slide in the slots in the cross beam. 4. So as to give a convex or concave curvature owing to the fact that the cross beams can be inverted; 5. Longitudinally, owing to the fact that the cross beams can be slid on the longitudinal beams. The fact that the supporting rods can be inclined each on its fixing bolts insures great uniformity of profile.

In the form shown in Fig. 5 the apparatus is also carried by a wagon, the framework 1 of which supports a frame formed of the cross beams 15 of iron of trough-section or any other suitable section, curved or not. These beams are united together in appropriate manner, such as by means of bars 16. The supporting rods 9, identical with those previously described and also comprising each a slot 10, are held in this case by means of two bolts 17, fixed to the beam 15. The slot 10 in each supporting rod allows of the rods being varied in position within the desired limits of height so that their heads 11 can be arranged in such a manner as to form collectively the desired profile.

Before proceeding to the shaping operation it may be useful to protect the polish of the glass by spreading on the surface of the mold a powdered material, such as molding sand or other suitable substance, or a refractory paste, plaster or the like, or to arrange on the surface a sheet of asbestos or the like.

The invention is not limited to the forms shown in the accompanying drawings and described with reference thereto. Numerous variations may be made in the construction of the apparatus without departing from the essence of the invention.

Having thus described our invention and the best means we know of carrying the same into practical effect, we claim:—

A mold for the purpose specified, embodying therein a carriage having longitudinal side bars spaced apart, a plurality of curved transverse bars spaced from each other and carried by the upper edges of said side bars, said transverse bars having longitudinal curved slots therein, means whereby said transverse bars may be removably secured to the side bars with either the concavity or the convexity of the curve uppermost, a plurality of adjacently arranged molding members carried by each of said transverse bars each of said molding members being individually movable and adjustable in relation to its companion members and in relation to the side bars and transverse bars, said molding members having enlarged heads and a bolt carried by each molding member and entering the slot in one of the transverse bars whereby said molding member may be secured in adjusted position.

In testimony whereof we affix our signatures in presence of two witnesses.

JULES GOFFIN.
VALMY DE LONGUEVILLE.

Witnesses:
N. COLINUD,
M. C. GERBCAULT.